Dec. 18, 1934.         G. F. DARLING         1,984,730
              RUBBER RING CUTTING MACHINE
                    Filed March 16, 1931
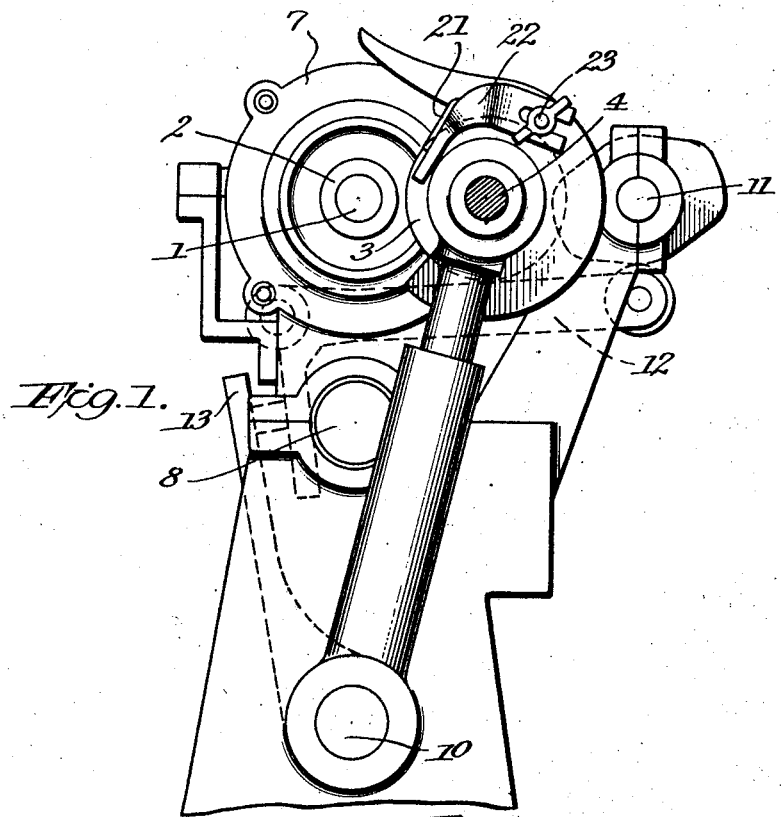
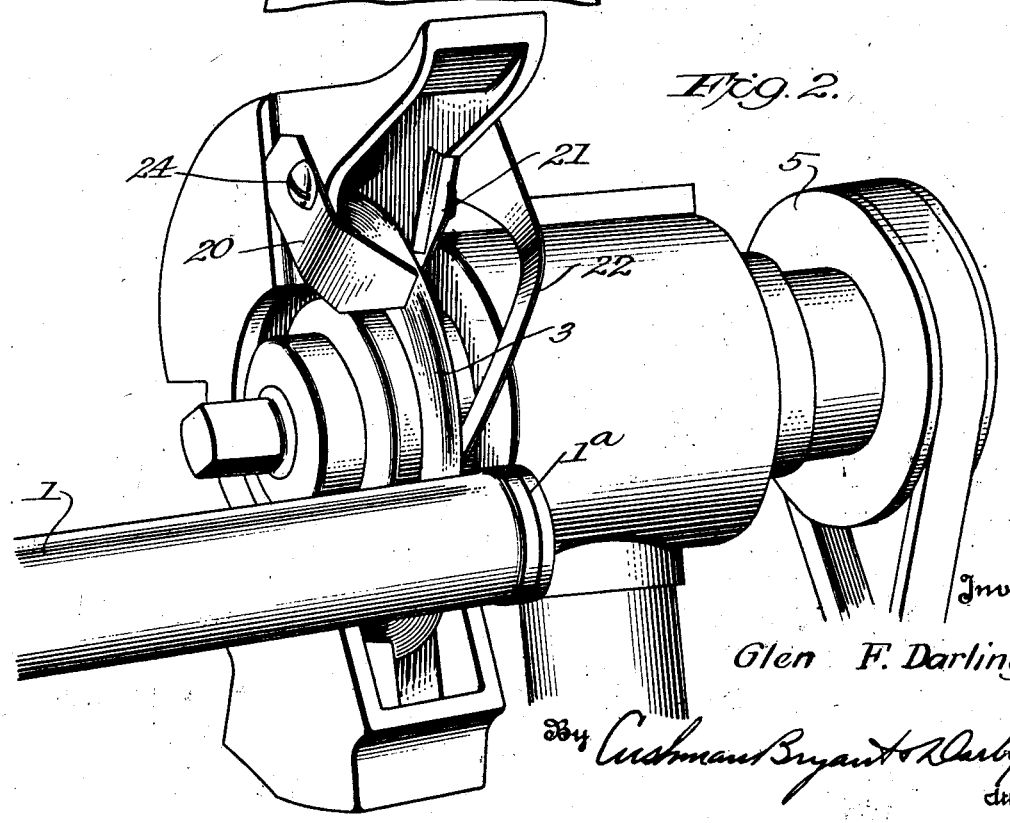
Inventor
Glen F. Darling Patented Dec. 18, 1934

1,984,730

UNITED STATES PATENT OFFICE 1,984,730

RUBBER RING CUTTING MACHINE

Glen F. Darling, Baltimore, Md., assignor to Crown Cork & Seal Company, Inc., Baltimore, Md., a corporation of New York Application March 16, 1931, Serial No. 523,151

5 Claims. (Cl. 164—69)

The present invention relates to improvements in machines for cutting rings from tubes of rubber or other material of the same characteristics adapted to serve as packing or sealing rings for closures for containers.

In the manufacture of rings for this purpose from rubber tubing it has heretofore been customary and believed to be essential to provide means for lubricating the edge of the cutter which is employed for severing the rings from a tube of stock.

The use of a lubricating medium, water being that most commonly employed, effects an undesirable coating of the ring with the lubricant substance, which interferes with, if it does not destroy, the adhesive qualities of the ring, and makes it difficult to vulcanize or cement the same within the cap or closure for a container. Particularly when water is employed as the lubricating medium, moisture which is trapped between the ring and the body of the closure cap is converted into steam under the effect of the heat commonly employed to secure the ring in position in the cap, and such steam prevents a uniform close adherence between the ring and cap throughout the area of the ring.

It has been heretofore considered to be necessary to thus lubricate the cutter or knife to prevent particles of the rubber stock from adhering to the knife and destroying the efficiency thereof.

By the present invention the necessity for employing a liquid lubricant for the rotary cutter of a rubber ring cutting machine is avoided, and the severed rings may be immediately introduced into the closure caps or container covers without requiring a preliminary cleaning or drying so that the time required for the manufacture of such rings is materially reduced as compared with the methods heretofore commonly followed.

The invention will be described in connection with the accompanying drawing, in which Figure 1 is an end elevation of a portion of a rubber ring cutting machine having an embodiment of the invention applied thereto, and Figure 2 is a perspective elevation.

Referring to the drawing, in both figures of which like parts are designated by the same reference charaters, the improved attachment is shown as applied to a rubber ring cutting machine of well-known type comprising a rotary mandrel 1 adapted to have a length of rubber tubing 2 supported thereby, and 3 designates a rotary disk-like knife or cutter that is suitably secured to a shaft 4 that is rotated by a band wheel 5.

The rubber stock tube 2 is clamped at one end to a head 7 adapted to move longitudinally of the supporting mandrel 1, said head being fed in the direction of the length of the mandrel by a suitable screw 8.

The cutter carrying shaft 4 is mounted to rock about an axis 10 so that the cutter 3 thereon will be moved to and from the axis of the mandrel 1 and caused to sever rings successively from the stock tube 2, the latter being intermittently advanced by the screw 8.

As shown, the rocking of the cutter carrying shaft 4 is effected by a rotating cam shaft 11 cooperating with a bell crank lever 12, the depending arm of which extends into the path of an arm 13 on the rock shaft 10. At each rotation of the shaft 11 a cam thereon will depress the free end of the bell crank 12 and the latter will actuate the arm 13 to rock the cutter carrying shaft so that the cutter is moved laterally to and from position where it will sever the tube of stock 2.

As shown, the stock supporting mandrel 1 is provided near its free end with an annular kerf or groove 1a which is in alignment with the cutter disc 3 and the screw shaft 8 is actuated at intervals to move the stock supporting mandrel the proper distance to provide rings of the desired thickness.

As the parts of the machine so far referred to are of well-known type, they are shown more or less conventionally in the drawing and it is not believed to be necessary to describe the same with more particularity.

According to the present invention, means are provided for applying friction to the faces of the cutter 3, adjacent the edge thereof, whereby the adherence to the cutter of any separated particles of rubber is prevented.

As shown, scraper-like blades of suitable material 20, 21 are supported by the housing within which the cutter disc rotates, and such blades or scrapers are so shaped and formed as to contact with the faces of the disc 3. The pressure exerted by the blades 20, 21 does not interfere with rotating the cutter disc at the proper speed to readily sever the stock tube 2 into rings but such blades or scrapers provide a sufficient friction to effectually remove from the cutter any particles of rubber tending to adhere thereto.

Further, in the embodiment of the invention illustrated, a spring-like separator blade 22 extends forward from the cutter housing or casing, and adjacent its free end bears frictionally against one face of the cutter disc.

The separating finger or member 22 not only serves to move the last severed ring lengthwise of the supporting mandrel 1, but also applies friction to the cutter disc.

In some instances the scraper or friction member 21 may be discarded and the cleaning of the cutter disc effected by the member 20 and separating finger 22. In other instances, it is found advisable to employ the exact arrangement shown in which two scrapers 20, 21 as well as the ring separating member 22, are adapted to exert frictional pressure on the cutter disc.

As shown, the separating finger 22 is adjustable relative to the cutter by having its rear end slotted and a securing screw 23 extending through the slot into the wall of the cutter casing.

Similarly, the friction applying fingers 20, 21 are adjustably connected with the cutter housing as by screws 24, so that the amount of pressure which said fingers will exert on the cutter disc may be varied as circumstances may dictate.

The action of the scraper or pressure applying members is to positively prevent the accumulation of any residue or particles of rubber on the cutter and to keep the surfaces thereof adjacent the cutting edge thereof in a highly polished condition. Extensive use of an attachment of the character shown has proven that by it the action of the cutter blade is more efficient, and the rings cut from the stock tube 2 are smoother than have been obtainable when water or other lubricant has been applied to the cutting edge, and also the objections incident to employing a liquid lubricant, above referred to, are entirely avoided.

It is believed that the operation and advantages of the invention will be readily understood from the foregoing description in connection with the drawing, and of course it will be appreciated that there can be modification of some of the details shown without departing from the invention. Except as specifically recited in the appended claims, it is not intended to limit the invention to the exact details shown, and as before noted, parts of the machine are shown more or less conventionally.

I claim:

1. In a machine for dry cutting rings from a rubber tube, the combination of a rotary tube support, a rotary cutter, means for effecting relative movement between said support and cutter to cause the latter to sever a rubber tube on the support, and relatively stationary friction means bearing against both faces of the cutter adjacent its edge to remove particles of the tube material adhering thereto.

2. In a machine for dry cutting rings from a rubber tube, the combination of a rotary tube support, a cutting disc mounted to rotate about an axis extending substantially parallel with the tube support, means for effecting relative movement between said disc and support to cause the disc to sever a rubber tube on the support, and a member adapted to move the severed section of the tube in the direction of the length of the support and to make frictional contact with a face of the cutter disc adjacent the edge thereof.

3. In a machine for dry cutting rings from a rubber tube, the combination of a rotary tube support, a cutting disc mounted to rotate about an axis extending substantially parallel with the tube support, means for effecting relative movement between said disc and support to cause the disc to sever a rubber tube on the support, a member adapted to move the severed section of the tube in the direction of the length of the support and exert a scraping action on one face of the cutter disc adjacent the edge thereof, and means for exerting a scraping action on the opposite face of the cutter disc.

4. In a machine for dry cutting rings from a rubber tube, the combination of a rotary tube support, rotary edged cutting means, means for effecting rotative movement between said support and cutting means to cause the latter to sever a rubber tube on the support, and spring fingers bearing against the sides of the cutting means adjacent the edge thereof to scrape from the cutting means any particles of tube material adhering thereto.

5. In a machine for dry cutting rings from a rubber tube, the combination of a rotary tube support, rotary edged cutting means, means for effecting rotative movement between said support and cutting means to cause the latter to sever a rubber tube on the support, and spring fingers bearing against the sides of the cutting means adjacent the edge thereof to scrape from the cutting means any particles of tube material adhering thereto, one of said fingers being so disposed and inclined as to engage behind a severed section and urge the same longitudinally of the supporting means.

GLEN F. DARLING.